March 19, 1940.  G. FRYFOGLE  2,194,015
REVERSIBLE CLUTCH MECHANISM
Filed Jan. 7, 1938
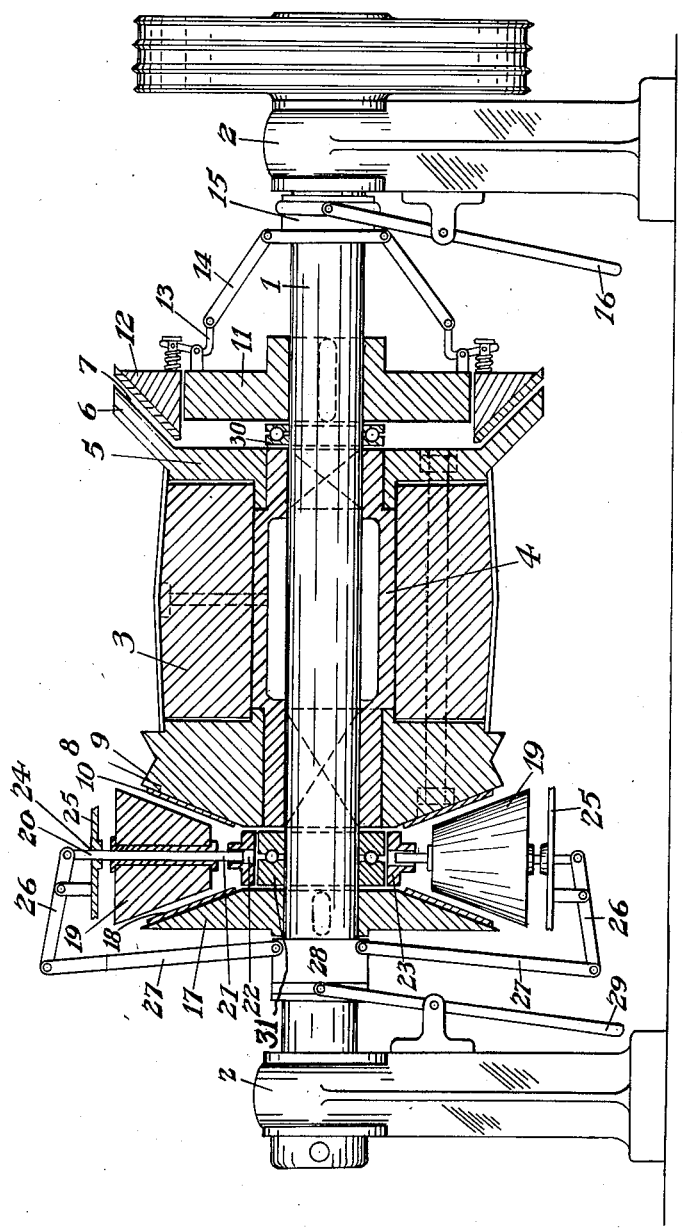
INVENTOR.
GEORGE FRYFOGLE
BY George B. Willey
ATTORNEY Patented Mar. 19, 1940

2,194,015

UNITED STATES PATENT OFFICE 2,194,015

REVERSIBLE CLUTCH MECHANISM

George Fryfogle, Mount Pleasant, Mich.

Application January 7, 1938, Serial No. 183,830

3 Claims. (Cl. 74—205)

This invention relates to mechanism for changing the direction of rotation of a pulley which is mounted on a shaft continuously rotatable in one direction. The improvement pertains more particularly to installations adapted for such duty as pumping oil wells, operating well drilling machinery or the like. In such cases the primary power shaft is not reversible as to its direction of rotation, but it is nevertheless called upon to deliver its power to the mechanism by means of a belt pulley which is capable of having its direction of rotation reversed at the will of the operator.

Heretofore, numerous devices have been employed for effecting such reversal, but they have been so arranged that if a task required the use of a pulley considerably larger in diameter, or one somewhat smaller, the operator had to purchase not only a new pulley, but also an entire new revolving mechanism.

An object of my invention is to provide a reversing drive mechanism which can be changed as to pulley diameter so as to suit different job requirements, and to do so by merely substituting one pulley for another without necessitating the repurchase of the main and most expensive part of the reversing mechanism.

Earlier types of pulley and clutch combinations generally required the shaft to be in two pieces. That arrangement was necessarily somewhat complicated. According to my present invention the shaft is in a single piece driven continuously in one direction by suitable power and the reversal of pulley rotation is attained by my improved coned-roller clutch mechanism having advantages of simplicity, efficiency and durability.

My improvement, therefore, pertains more particularly to devices characterized by having a shaft rotatable in one direction only, with a pulley loose on the shaft and two clutches, one having a member keyed to the shaft and rotatable with it, the face of the clutch being adapted to engage and drive the pulley when it is desired to rotate the pulley in the same direction as the shaft. Reversal of the pulley is effected by a friction transmission which through a set of intermediate conical rollers rotates the pulley in reverse direction.

In earlier reversible devices that employed coned rollers the rollers were so mounted that they moved inwardly or outwardly to engage or disengage co-operating raceway faces, but this inward and outward movement was along a curved path, giving the rollers a sort of sidewise or diagonal approach to the beveled faces. That approach resulted in more or less slippage while driving contact was being established between the rollers and the raceway face. Rollers thus brought into action along an angular path of approach to the raceway surfaces frequently heated under the heavy load because of friction resulting from such indirect contact approach.

It is therefore an object of my invention to so mount the conical rollers with relation to the axis of the shaft that their approach to the raceway face will be in a direct radial line, giving fair rectilinear contact when the working faces meet. This arrangement eliminates one of the objections which in practice have been found inherent in earlier devices.

With the foregoing and certain other objects in view, which will appear later in the specification, my invention comprises the devices shown in the accompanying drawing and set forth in the appended claims.

The drawing is a vertical longitudinal part sectional view of a pulley reversing mechanism embodying my improvement, certain incidental parts of the apparatus being shown diagrammatically.

Referring to the drawing, 1 designates a piece of shafting which is mounted in suitable bearings 2 and is continuously rotatable in one direction by any suitable means. A split pulley 3 with a metal bushing 4 is mounted as a spool on the shaft between the bearings. The pulley and bushings are arranged so both can be removed from the shaft 1 and replaced, or a pulley of larger or smaller diameter can be substituted on the bushing without requiring any change in the design and general construction of the mechanism for reversing the direction of rotation of the pulley, which will now be described.

A clutch disk member 5 is keyed on the bushing at one end, and has an integral annular flange 6 with an external conical friction clutch face 7. Fixed to the other or left-hand end of the bushing 4 is a disk 8 having a peripheral brake drum face 9 and an outer conical raceway face 10. Thus it is seen that the spool has a conical clutch face at each end and a replaceable pulley in the middle. To operate on the faces 7 and 10 the following devices are employed:

A disk flange 11 is fixed to the shaft adjacent the face 7, and a movable clutch member 12 is mounted upon the flange 11, being capable of sliding thereon in a direction lengthwise the shaft so as to engage and disengage the clutch face 7.

Any suitable means may be provided for operatively engaging the face 7 with the clutch member 12. For example, the member 12 can be brought into engagement or be released by means of pivoted L-levers 13, links 14, and a slidable collar 15 on shaft 1. The collar can be moved along the shaft for engaging or disengaging the clutch by a shifter arm 16.

A second disk flange 17 has a conical raceway face 18, and between the two faces 10 and 18 are conical friction transmission rollers 19. These rollers are mounted for lengthwise movement along radial paths toward the axis of shaft 1 so that the engagements of each roller with the two faces 10 and 18 will occur simultaneously and each roller 19 will have correct rolling movement upon the faces as soon as contact is made. This arrangement for rectilinear movement of the rollers avoids all undesirable rubbing or grinding action between the contacting surfaces and to a great extent prevents slippage because the surfaces have true rolling contact both on approach and in full driving engagement. Each roller 19 is removably received between the faces 10 and 18, and its stated rectilinear radial movement is accomplished by substantially the following means:

Numeral 20 indicates a non-rotatable spindle upon which the revolvable roller 19 is mounted. The inner projecting end 21 of the spindle is capable of limited endwise sliding movement in a bearing 22 which is provided in a floating ring 23. The outer end of spindle 20 slides in a guide 24 in a fixed support 25, which may be a part of the housing of the machine. The spindles are actuated by means located outside of the periphery of the disks and rollers.

Preferably, two or more cones are thus mounted. They are connected together by pivoted levers 26 and links 27 which are connected to a collar 28 slidable along the shaft 1 by means of a pivotally mounted shifter arm 29. The arm can be operated manually in order to engage or disengage the roller 19 from the faces 10 and 18 simultaneously, thus causing the pulley 3 to rotate in one direction, or to remain idle.

It will be noted that a thrust bearing 30, shown at the right in the drawing, abuts against the disk flange 11 as against a fixed stop so as to take the endwise thrust of pulley 3 whenever the left-hand raceway transmission face 10 is engaged by cones 19 and the latter are being rotated by contact with the face 18. A similar thrust bearing 31 is interposed between raceway members 9 and 17.

The left-hand thrust bearing 31 transmits the thrust of the right-hand clutch member 12 over to the second disk flange 17 when the member 12 is driving the pulley 3 in the same direction as the shaft 1.

The thrust bearings 30 and 31 fit snugly between the bushing 4 and the disk flanges 11, 17, respectively.

The pulley 3 which is preferably split can be easily removed from the rotatable shaft 1 and a pulley of larger or smaller diameter can be substituted.

By the means above described I have provided a simple and efficient reversible driving mechanism wherein the driving pulley can be radially changed in the field to suit different jobs. The means for shifting the clutch member 12 and the rollers 19 may be the shifter arms 16 and 29, movable independently of each other by hand, or these members may be connected together so they can be shifted simultaneously.

Having thus described my invention, what I claim and desire to secure by Letters Patent is:

1. A shaft mounted for rotation in one direction, a bushing loose on said shaft, a clutch disk fixed upon an end of said bushing and a raceway transmission disk on the other end thereof having a conical face, a pulley removably secured to the bushing between said disks; a thrust bearing on said shaft at each end of said bushing, two flanges fixed to said shaft, each being spaced from the outer face of a thrust bearing, one of said flanges carrying movable clutch elements and actuating mechanism for engaging the same with the first mentioned clutch disk, the other flange having a conical raceway transmission face opposed to the face of said raceway transmission disk; a plurality of conical rollers removably received between the said complementary raceway faces, and means located outside the periphery of said faces connecting said rollers and adapted to move the same lengthwise of their axes and in radial direction into and out of engagement with said raceway faces.

2. A shaft, a spool loose on said shaft and having at each end a disk, a pulley removably secured to the spool between said disks; a thrust bearing on said shaft at each end of said spool, two flanges fixed to the shaft spaced from the ends of the spool and adjacent the respective thrust bearings, one of said flanges carrying movable clutch elements and actuating mechanism, the other flange having a conical raceway transmission face opposed to the face of said second disk; a plurality of conical rollers removably received between the said complementary faces, spindles for said rollers, a floating ring surrounding one of said thrust bearings, spaced therefrom and presenting a series of bearings for the inner ends of said spindles and connecting said rollers, and means located outside the periphery of said faces adapted to move the rollers and spindles lengthwise radially toward or away from said ring and into and out of engagement with said clutch faces.

3. A structure as set forth in claim 2 wherein a peripheral brake drum face is provided on the rim of the raceway transmission disk, adjacent the rim of said pulley.

GEORGE FRYFOGLE.